(12) United States Patent
Alexander et al.

(10) Patent No.: US 10,883,205 B2
(45) Date of Patent: Jan. 5, 2021

(54) TECHNICAL KNIT ARCHTECTURES FOR COMFORT SEATING

(71) Applicant: GM Global Technology Operations LLC, Detroit, MI (US)

(72) Inventors: Paul W. Alexander, Ypsilanti, MI (US); Nilesh D. Mankame, Ann Arbor, MI (US); Wonhee M. Kim, Royal Oak, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 15/854,190

(22) Filed: Dec. 26, 2017

(65) Prior Publication Data
US 2019/0193373 A1 Jun. 27, 2019

(51) Int. Cl.
*D04B 1/22* (2006.01)
*B32B 5/02* (2006.01)
*A47C 31/00* (2006.01)
*B60N 2/70* (2006.01)

(52) U.S. Cl.
CPC ............ *D04B 1/22* (2013.01); *A47C 31/006* (2013.01); *B32B 5/026* (2013.01); *B60N 2/7017* (2013.01); *B32B 2601/00* (2013.01); *B32B 2605/003* (2013.01); *D10B 2403/021* (2013.01); *D10B 2403/0211* (2013.01)

(58) Field of Classification Search
CPC .................... B29C 66/81455; B60N 2/7017
See application file for complete search history.

(56) References Cited

U.S. PATENT DOCUMENTS

| | | | |
|---|---|---|---|
| 5,021,281 A | 6/1991 | Bompard et al. |
| 5,858,159 A | 1/1999 | Holbrook et al. |
| 6,350,709 B1 | 2/2002 | Veiga |
| 6,808,587 B2 | 10/2004 | Bohm et al. |
| 7,437,774 B2 | 10/2008 | Baron et al. |
| 7,976,924 B2 | 7/2011 | Stanford, Jr. et al. |
| 8,362,882 B2 | 1/2013 | Heubel et al. |
| 8,371,339 B2 | 2/2013 | Li et al. |
| 9,090,998 B2 | 7/2015 | Williams |

(Continued)

FOREIGN PATENT DOCUMENTS

| | | |
|---|---|---|
| CN | 101640953 A | 8/2009 |
| CN | 101640953 A | 2/2010 |

OTHER PUBLICATIONS

Textile Glossary, Celanese Acetate, copyright 2001 (Year: 2001).*

*Primary Examiner* — Jennifer A Steele
(74) *Attorney, Agent, or Firm* — Quinn IP Law

(57) ABSTRACT

A vehicle seat includes a first knitted fabric layer defining an outer surface and a second knitted fabric layer defining an inner surface. The inner surface is opposite the outer surface. The vehicle seat further includes a knitted spacer fabric interconnecting the first knitted fabric layer and the second knitted fabric layer. The knitted spacer fabric resiliently biases the first knitted fabric layer and the second knitted fabric layer away from one another. The knitted spacer fabric is configured to buckle when a seated occupant exerts an occupant load on the vehicle seat. The first knitted fabric layer is more elastic than the second knitted fabric layer to conform to the seated occupant when the seated occupant exerts the occupant load on the vehicle seat.

8 Claims, 4 Drawing Sheets

(56) References Cited

U.S. PATENT DOCUMENTS

| | | | |
|---|---|---|---|
| 9,521,885 B2 | 12/2016 | Weber et al. | |
| 2003/0101776 A1* | 6/2003 | Shirasaki | D04B 21/12 66/196 |
| 2003/0106346 A1* | 6/2003 | Matsumoto | D04B 21/10 66/195 |
| 2004/0145230 A1* | 7/2004 | Fujita | A47C 31/006 297/452.27 |
| 2009/0044338 A1* | 2/2009 | Rock | A47C 27/007 5/500 |
| 2010/0129575 A1 | 5/2010 | Veiga | |
| 2011/0062134 A1 | 3/2011 | Lochtman et al. | |
| 2011/0283459 A1* | 11/2011 | Essers | A47C 27/22 5/699 |
| 2012/0280479 A1 | 11/2012 | Barth et al. | |
| 2013/0057035 A1* | 3/2013 | Nishiura | B60N 2/7011 297/218.3 |
| 2014/0001814 A1* | 1/2014 | Fujita | A47C 7/287 297/452.48 |
| 2016/0303799 A1 | 10/2016 | Pettey et al. | |
| 2017/0249033 A1 | 8/2017 | Podhajny et al. | |

* cited by examiner

TECHNICAL KNIT ARCHTECTURES FOR COMFORT SEATING

INTRODUCTION

The present disclosure relates to technical knit architectures for comfort seating.

A seat assembly, such as a seat assembly for a vehicle, includes a generally upright seat back and a generally horizontal lower seat base. Each of the seat back and the seat base typically includes a frame, a suspension, a cushion, and a trim material. The trim material is used to cover the cushion, suspension and frame, and to provide an exterior surface for contact with an occupant of the seat assembly. The frame provides the support structure to attach the seat back and the lower seat base to each other and/or to the vehicle. The cushion is typically made from an expandable foam material and is molded to a predetermined shape as required by the shape of the seat back and the lower seat base. The configuration of the trim material, the cushion and the suspension collectively determine the contact area of an occupant seated in the seat assembly, and the pressure distribution of the contact pressure experienced by the seated occupant. The comfort of the seated occupant is affected by the area and pattern of the occupant's contact with the lower seat base and the seat back surfaces, and by the maximum contact pressure and the pressure distribution of the contact pressure experienced by the seated occupant.

SUMMARY

The present disclosure relates to a vehicle seat with technical knit architectures for comfort seating. For this new type of seating, the knitted structures disclosed herein would be nominally replacing the standard cushion and suspension. In addition to serving a trim for seating, the presently disclosed 3D knitted structure may also be suspended from the frame and serve as a cushion, suspension and trim. In some embodiments, the vehicle seat includes a first knitted fabric layer defining an outer surface and a second knitted fabric layer defining an inner surface. The inner surface is opposite the outer surface. The vehicle seat further includes an interconnection, such as a knitted spacer fabric, that couples the first knitted fabric layer to the second knitted fabric layer. The knitted spacer fabric resiliently biases the first knitted fabric layer and the second knitted fabric layer away from one another. The knitted spacer fabric is configured to buckle when a seated occupant exerts an occupant load on the vehicle seat or frame. The first knitted fabric layer is more elastic than the second knitted fabric layer to conform to the seated occupant when the seated occupant exerts the occupant load on the vehicle seat. The tension in the second knitted fabric layer is higher than the tension in the first knitted fabric layer. The interconnection may include the knitted spacer fabric, and the knitted spacer fabric may include a plurality of pile yarns interconnecting the first knitted fabric layer and the second knitted fabric layer. The plurality of pile yarns may resiliently bias the first knitted fabric layer and the second knitted fabric layer away from each other. The first knitted fabric layer may be more compliant than the second knitted fabric layer to allow the first knitted fabric layer to conform to the seated occupant when the seated occupant exerts the occupant load on the vehicle seat or frame.

In some embodiments, the knitted spacer fabric includes a first support area and a second support area spaced apart from each other along a horizontal direction, the first support area and the second support area are stiffer than the rest of the knitted spacer fabric to constrain load transfer when the seated occupant exerts the occupant load on the vehicle seat, and the first support area and second support area are positioned to receive a pair of sit bones of the seated occupant. The first knitted fabric layer may include a first layer area and a second layer area spaced apart from each other along the horizontal direction, the first layer area and the second layer area are stiffer than the rest of the first knitted fabric layer to constrain load transfer when the seated occupant exerts the occupant load on the vehicle seat. The first layer area and second layer area are positioned to receive the pair of sit bones of the seated occupant. The first layer area of the first knitted fabric layer is aligned with the first support area of the knitted spacer fabric along a first vertical axis such that the first vertical axis intersects the first layer area and the first support area. The second layer area of the second knitted fabric layer is aligned with the second support area of the knitted spacer fabric along a second vertical axis such that the second vertical axis intersects the second layer area and the second support area, the first vertical axis is parallel to the second vertical axis, and the first vertical axis is spaced apart from the second vertical axis along the horizontal direction. The first layer area of the first knitted fabric layer is aligned with the first support area of the knitted spacer fabric along a vertical direction, the vertical direction is perpendicular to the horizontal direction, the first layer area and the second layer area are aligned with each other along a longitudinal direction in order to receive the pair of sit bones of the seated occupant, and the longitudinal direction is perpendicular to the vertical direction and the horizontal direction. Each of the first support area and the second support area extends from the first knitted fabric layer to the second knitted fabric layer to constrain load transfer from the first knitted fabric layer and the second knitted fabric layer through the first support area and the second support area when the seated occupant exerts the occupant load on the vehicle seat in order to support the pair of sit bones of the seated occupant.

The present disclosure also describes a method for mechanically interlocking a first knitted fabric layer and a second knitted fabric layer. In some embodiments, the method includes: (a) placing the first knitted fabric layer relative to the second knitted fabric layer so as to define a clearance between the first knitted fabric layer and the second knitted fabric layer to facilitate sliding movement between the first knitted fabric layer and the second knitted fabric layer; (b) sliding the first knitted fabric layer relative to the second knitted fabric layer along a horizontal direction until the first knitted fabric layer and the second knitted fabric layer collectively reach a predetermined stacked position; and (c) placing the first knitted fabric layer and the second knitted fabric layer on the outside surfaces of a bladder while there is still space between the first knitted fabric layer and the second knitted fabric layer. The molded skin is placed solely on the outside surfaces while there is still space between the layers. Then, when in service, a vacuum can be drawn to collapse a bladder (e.g., an inflatable paradigm) and force the knit layers in to contact and rigidizing them. Also, the nominal state is the collapsed, the bladder could be inflated so that the layers cease to make contact and allow for relative motion between the knit layers. The method may further include drawing a vacuum to collapse the bladder in order to jam the first knitted fabric layer and the second knitted fabric layer together, thereby interlocking the first knitted fabric layer toward the second knitted fabric layer in the predetermined stacked position.

The method may further include bending the first knitted fabric layer and the second knitted fabric layer until the first knitted fabric layer and the second knitted fabric layer collectively reach a predetermined deformed shape. The method may further include inflating the bladder to separate the first knitted fabric layer and the second knitted fabric layer from each other in order to allow relative movement between the first knitted fabric layer and the second knitted fabric layer.

In some embodiments, the method includes: (a) providing the first knitted fabric layer, the second knitted fabric layer, and a knitted spacer fabric interconnecting the first knitted fabric layer and the second knitted fabric layer; (b) simultaneously bending the first knitted fabric layer, the second knitted fabric layer, and the knitted spacer fabric until the first knitted fabric layer, the second knitted fabric layer, and the knitted spacer fabric collectively reach a predetermined deformed shape; and (c) placing the first knitted fabric layer, the second knitted fabric layer, and the knitted spacer fabric on a bladder after the first knitted fabric layer, the second knitted fabric layer, and the knitted spacer fabric are in the predetermined deformed shape. The method may further include drawing a vacuum to collapse the bladder to jam the first knitted fabric layer, the second knitted fabric layer, and the knitted spacer fabric together, thereby interlocking the first knitted fabric layer, the second knitted fabric layer, and the knitted spacer fabric in the predetermined deformed shape. The knitted spacer fabric includes a plurality of pile yarns interconnecting the first knitted fabric layer and the second knitted fabric layer. The method may further include inflating the bladder to separate the first knitted fabric layer and the second knitted fabric layer from each other in order to allow relative movement between the first knitted fabric layer and the second knitted fabric layer.

The above features and advantages and other features and advantages of the present disclosure are readily apparent from the following detailed description of the best modes for carrying out the disclosure when taken in connection with the accompanying drawings.

DETAILED DESCRIPTION

Figure 1:
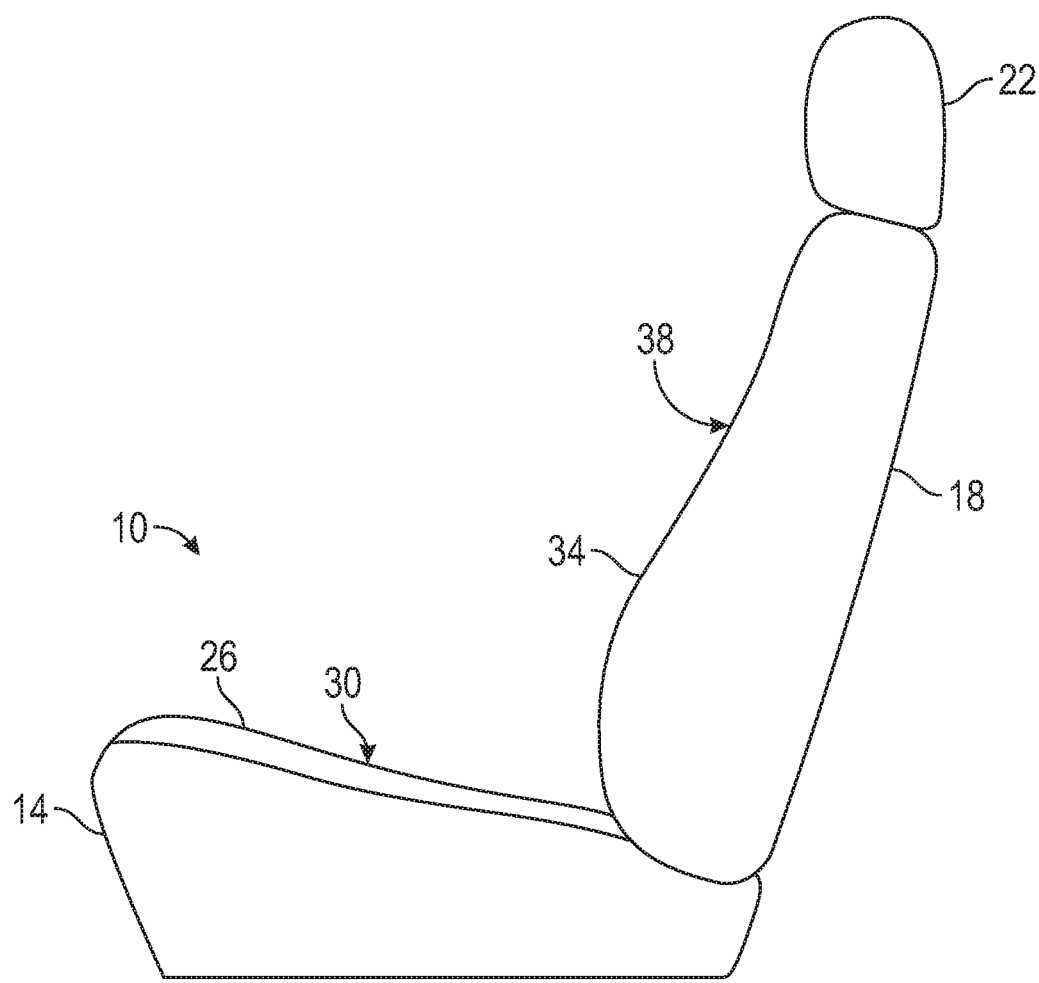
FIG. 1 is a schematic, side view of a vehicle seat, including a lower seat base and a seat back.
Figure 3:
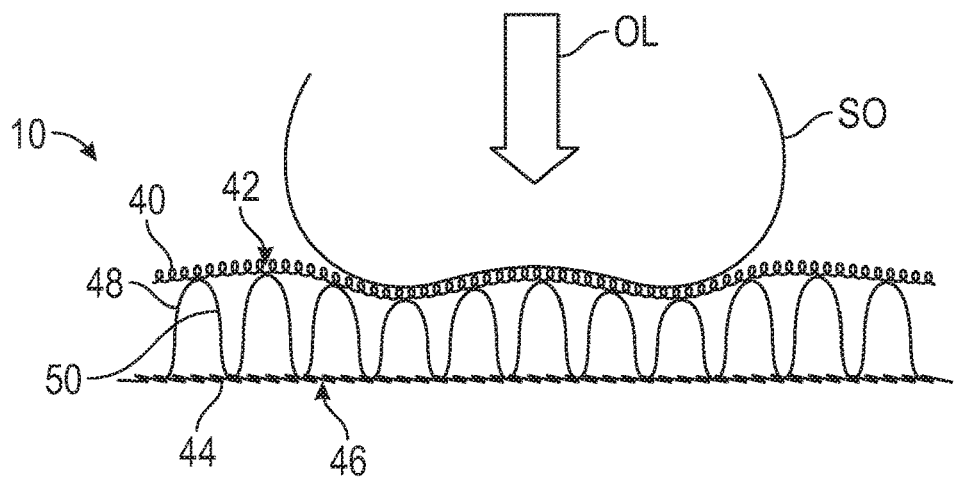
FIG. 3 is a schematic, cross-sectional view of the vehicle seat of FIG. 2, depicting a seated occupant exerting an occupant load on the seat.

Referring to FIG. 1, a vehicle seat 10 (i.e., a seat for installation in a vehicle) is schematically illustrated. The seat 10 includes a lower seat base 14, a seat back 18, and a headrest 22. In some embodiments, the lower seat base 14 may include a flexible base cover 26 that defines at least part of the outside of the lower seat base 14. For instance, the flexible base cover 26 may define a generally horizontal surface 30 for supporting a seated occupant SO (FIG. 3). The seat back 18 is mounted with respect to the lower seat base 14. In some embodiments, the seat back 18 is rigidly mounted with respect to the lower seat base 14. In certain embodiments, the seat back 18 is pivotally mounted with respect to the lower seat base 14 to allow the seated occupant SO to adjust the angle between the seat back 18 and the lower seat base 14.

In some embodiments, the seat back 18 may include a flexible back cover 34 that defines at least part of the surface of the seat back 18, including a generally vertical surface 38, which provides support of the back of the seated occupant. The headrest 22 is mounted with respect to the seat back 18 adjacent an upper edge of the seat back 18.

Figure 2:
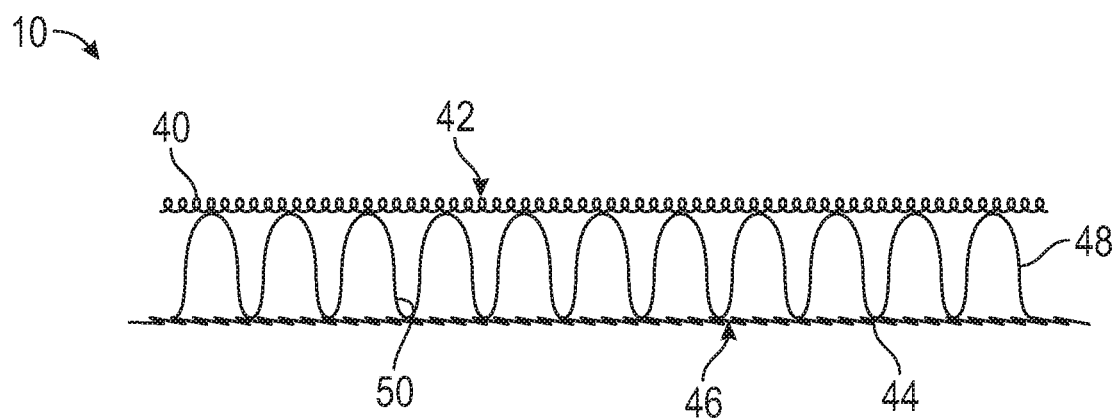
FIG. 2 is a schematic, cross-sectional view of the vehicle seat of FIG. 1.
Figure 4:
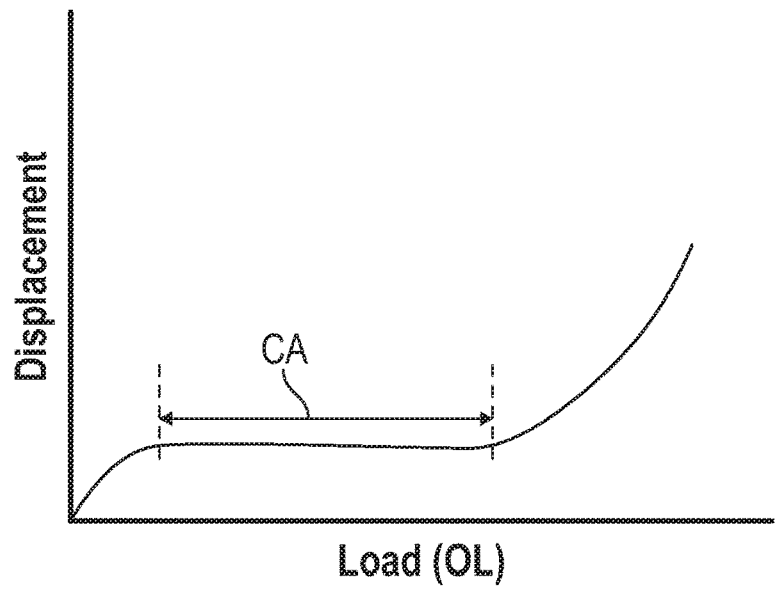
FIG. 4 is a graph illustrating a relationship between the occupant load and the displacement of the seat shown in FIG. 2.

With reference to FIGS. 2-4, the vehicle seat 10 includes a first knitted fabric layer 40 defining an outer surface 42. In the present disclosure, the term "knitted" does not include woven materials. For instance, the term "knitted" may refer to weft knitted materials. In addition, the vehicle seat 10 includes a second knitted fabric layer 44 defining an inner surface 46, which is opposite the outer surface 42. The vehicle seat 10 includes an interconnection 48 directly interconnecting the first knitted fabric layer 40 and the second knitted fabric layer 44. The interconnection 48 may be a knitted spacer fabric, strips running lengthwise between the first knitted fabric layer 40 and the second knitted fabric layer 44, vertical tubular links between the first knitted fabric layer 40 and the second knitted fabric layer 44. The interconnection 48 resiliently biases the first knitted fabric layer 40 and the second knitted fabric layer 44 away from one another when no occupant load OL is exerted on the vehicle seat 10. Further, the interconnection 48 is configured to buckle when the seated occupant SO exerts an occupant load OL on the vehicle seat 10. In the depicted embodiment, the interconnection 48 includes a plurality of pile yarns 50 directly interconnecting the first knitted fabric layer 40 and the second knitted fabric layer 44. Accordingly, the pile yarns 50 are configured to buckle when the seated occupant SO exerts the occupant load OL on the vehicle seat 10. The pile yarns 50 resiliently bias the first knitted fabric layer 40 and the second knitted fabric layer 44 away from each other when the occupant load OL is exerted on the vehicle seat 10. The pile yarns 50 may be made of polyester, acrylic, nylon, or other suitable material. Further, the interconnection 48 is a three-dimensional knit structure.

The first knitted fabric layer 40 is more elastic than the second knitted fabric layer 44 to conform to the seated occupant SO when the seated occupant SO exerts the occupant load OL on the vehicle seat 10. Also, the first knitted fabric layer 40 is more compliant than the second knitted fabric layer 44 to allow the first knitted fabric layer 40 to conform to the seated occupant SO when the seated occupant SO exerts the occupant load OL on the vehicle seat 10. The second knitted fabric layer 44 is stiffer than the first knitted fabric layer 40 to provide primary support for the seated occupant SO. To do so, the tension in the second knitted fabric layer 44 is higher than the tension in the first knitted fabric layer 40.

With specific reference to FIGS. 3 and 4, when the seated occupant SO exerts the occupant load OL on the vehicle seat 10, the first knitted fabric layer 40 moves toward the second knitted fabric layer 44 and the interconnection 48 collapses and bunches together, thereby transferring loads from the first knitted fabric layer 40 to the second knitted fabric layer 44. FIG. 4 shows a relationship between the occupant load OL and the displacement of the vehicle seat 10. When the seated occupant SO sits on the vehicle seat 10, the vehicle seat 10 has a comfort area CA in which the vehicle seat 10 conforms to the seated occupant SO, and the interconnection 48 buckles and bunches in response to the occupant load OL, thereby enhancing comfort for the seated occupant SO.

Figure 5:
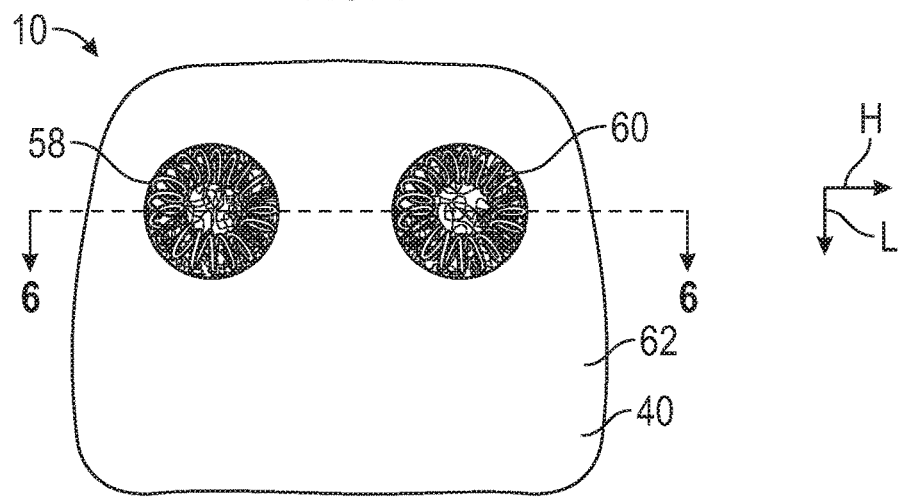
FIG. 5 is a schematic top view of the vehicle seat in accordance with another embodiment of the present disclosure.
Figure 6:
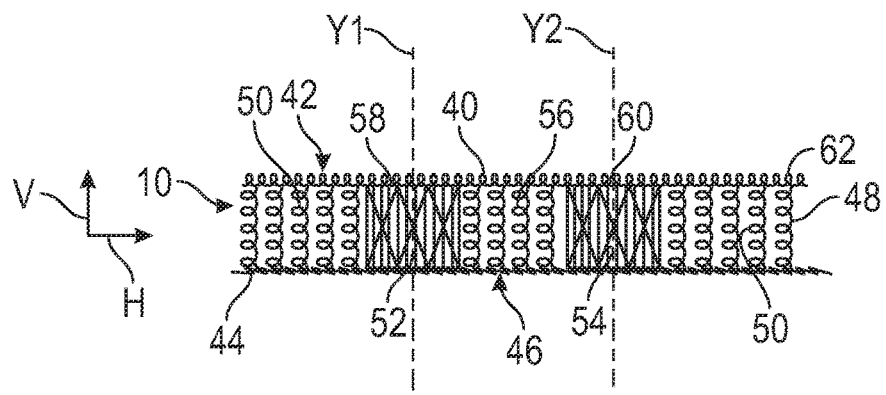
FIG. 6 is a schematic, cross-sectional view of the vehicle seat of FIG. 5, taken along section line 6-6 of FIG. 5.

With reference to FIGS. 5 and 6, in some embodiments, the interconnection 48 includes a first support area 52 and a second support area 54 spaced apart from each other along a horizontal direction H. The embodiments shown in FIGS. 5 and 6 are substantially similar to the other embodiments described above. Therefore, in the interest of brevity, solely the differences between this embodiment and the embodiment described above are described below. The first support area 52 and the second support area 54 are stiffer than the rest of the interconnection 48 (i.e., the compliant spacer area 56) to constrain load transfer when the seated occupant SO (FIG. 3) exerts the occupant load OL (FIG. 3) on the vehicle seat 10. The first support area 52 and second support area 54 are positioned to receive a pair of sit bones of the seated occupant SO (FIG. 3), thereby enhancing the comfort for the seated occupant SO. The compliant spacer area 56 is made of a softer fill material than the material forming the first support area 52 and the second support area 54 to allow for better conformal properties and less load transfer than other vehicle seats. To do so, the fill material (e.g., pile yarns 50) forming the first support area 52 and the second support area 54 is stiffer and/or denser than the fill material forming the compliant spacer area 56 in order to contain the targeted loading areas (i.e., the first support area 52 and the second support area 54) and to directly transfer loads from the first knitted fabric layer 40 to the second knitted fabric layer 44, which is made of a material that is stiffer than the material forming the first knitted fabric layer 40. As a result of this configuration, the comfort for the seated occupant SO seated on the vehicle seat 10 is enhanced. The first knitted fabric layer 40 and the second knitted fabric layer 42 is each individually tensioned (the tension in the first knitted fabric layer 40 relatively lower for more comfort compliance and the tension in the second knitted fabric layer 42 is relatively higher for suspension). The pile yarns 50 are also tensioned or preloaded. Then, when the 3D knit (e.g., vehicle seat 10) is loaded, each of the filaments of the pile yarns 50 acts as columns in buckling, exhibiting a certain stiffness level or firmness before buckling and becoming much more compliant and conformal. Then, finally when loaded enough, the first knitted fabric layer 40 may come into contact with the second knitted fabric layer 44, which due to its higher tension/more dense construction serves to take the loads and as a suspension.

With continued reference to FIGS. 5 and 6, the first knitted fabric layer 40 includes a first layer area 58 and a second layer area 60 spaced apart from each other along the horizontal direction H. The first layer area 58 and the second layer area 60 are stiffer than the rest of the first knitted fabric layer 40 (i.e., the compliant layer area 62) to constrain load transfer when the seated occupant SO exerts the occupant load OL on the vehicle seat 10. The compliant layer area 62 on the first knitted fabric layer 40 can easily conform to the seated occupant SO to enhance comfort. On the other hand, the first layer area 58 and the second layer area 60 do not conform as much as the compliant layer area 62 and allow load transfer from the first knitted fabric layer 40 to the second knitted fabric layer 44 through the first support area 52 and the second support area 54 in order to support the sit bones of the seated occupant SO. Accordingly, the first support area 52 and second support area 54 are positioned to receive the pair of sit bones of the seated occupant SO. As discussed above, the second knitted fabric layer 44 is stiffer than the first knitted fabric layer 40 to support the seated occupant SO. To do so, the second knitted fabric layer 44 can be configured with more constraining stitch pattern, stiffer yarns, and/or more highly pretensioned yarns than the first knitted fabric layer 40. The first layer area 58 of the first knitted fabric layer 40 is aligned with the first support area 52 of the interconnection 48 along a first vertical axis Y1. As such, the first vertical axis Y1 intersects the first layer area 58 and the first support area 52 to support one of the sit bones of the seated occupant SO. The second layer area 60 of the second knitted fabric layer 44 is aligned with the second support area 54 of the interconnection 48 along a second vertical axis Y2. As such, the second vertical axis Y2 intersects the second layer area 60 and the second support area 54 to support at least one of the sit bones of the seated occupant SO. The first vertical axis Y1 is parallel to the second vertical axis Y2 to ensure that the first layer area 58 and the second support area 60 support the sit bones of the seated occupant SO. The first vertical axis Y1 is spaced apart from the second vertical axis Y2 along the horizontal direction H. The interconnection 48 functions as a pad to sustain shear loads.

The first layer area 58 of the first knitted fabric layer 40 is aligned with the first support area 52 of the interconnection 48 along a vertical direction V. The vertical direction V is perpendicular to the horizontal direction H. The first layer area 58 and the second layer area 60 are aligned with each other along a longitudinal direction L in order to receive the pair of sit bones of the seated occupant SO. The longitudinal direction L is perpendicular to the vertical direction V and the horizontal direction H. Each of the first support area 52 and the second support area 54 extends from the first knitted fabric layer 40 to the second knitted fabric layer 44 to constrain load transfer from the first knitted fabric layer 40 and the second knitted fabric layer 44 through the first support area 52 and the second support area 54, respectively, when the seated occupant SO exerts the occupant load OL on the vehicle seat 10 in order to support the sit bones of the seated occupant SO.

Figure 7:
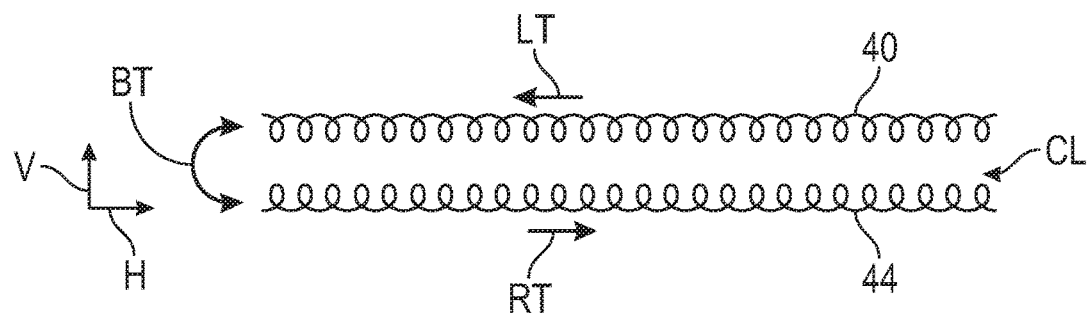
FIG. 7 is a schematic, side view of a first knitted fabric layer and a second knitted fabric layer before being placed on a bladder.
Figure 8:
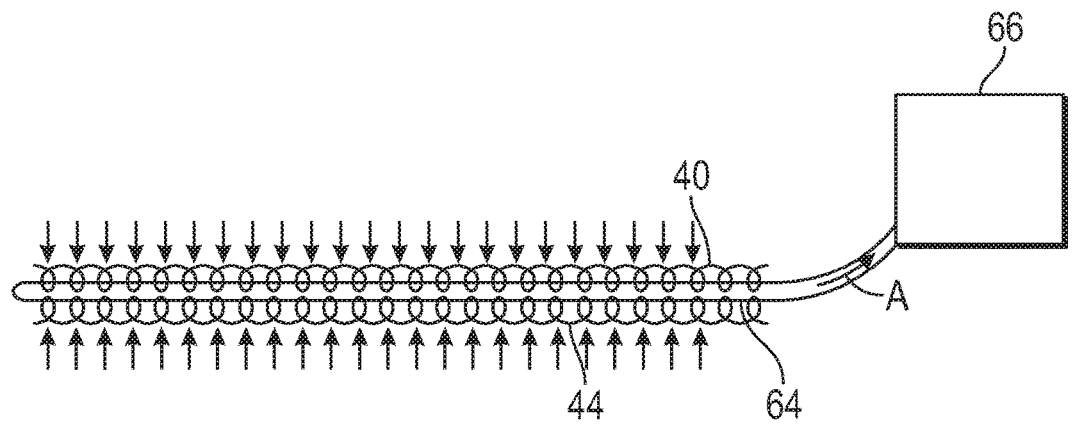
FIG. 8 is a schematic, side view of a first knitted fabric layer and a second knitted fabric layer of FIG. 7 placed on the bladder.

With reference to FIGS. 7 and 8, all of the vehicle seats 10 described in the present disclosure can be created with a method for interlocking the first knitted fabric layer 40 and the second knitted fabric layer 44. In this method, the first knitted fabric layer 40 is placed relative to the second knitted fabric layer 44 such that a clearance CL is defined between the first knitted fabric layer 40 and the second knitted fabric layer 44. Due to this clearance CL, the first knitted fabric layer 40 and the second knitted fabric layer 44 can slide relative to each other in the horizontal direction H (see arrows LT and RT). The clearance CL also allows the first knitted fabric layer 40 and the second knitted fabric layer 44 to be bent, for example, in the direction indicated by double arrows BT. For instance, the first knitted fabric layer 40 and the second knitted fabric layer 44 can be bent until the first knitted fabric layer 40 and the second knitted fabric layer 44 collectively reach a predetermined deformed shape. Thereafter, the first knitted fabric layer 40 and/or the second knitted fabric layer 44 are slid relative to the other along the horizontal direction H until the first knitted fabric layer 40 and the second knitted fabric layer 44 collectively reach a predetermined stacked position. After (and while) the first knitted fabric layer 40 and the second knitted fabric layer 44 are in the predetermined stacked position but spaced apart from each other, the first knitted fabric layer 40 and the second knitted fabric layer 44 are placed on the outside surfaces of a bladder 64 as shown in FIG. 8. While there is still space between the first knitted fabric layer 40 and the second knitted fabric layer 44, the molded skin (e.g., the first knitted fabric layer 40 and the second knitted fabric layer 44) is placed only on the outside surfaces of the bladder 64 (e.g., an inflatable paradigm). Then, when in service, a vacuum can be drawn to collapse the bladder 64 and force the first knitted fabric layer 40 and the second knitted fabric layer 44 to be in contact, thereby rigidizing the first knitted fabric layer 40 and the second knitted fabric layer 44. Once the first knitted fabric layer 40 and the second knitted fabric layer 44 are disposed on the bladder 64 in the predetermined stacked position, a vacuum is drawn in the bladder 64 to jam the first knitted fabric layer 40 and the second knitted fabric layer 44 together, thereby interlocking the first knitted fabric layer 40 toward the second knitted fabric layer 44 in the predetermined stacked arrangement to create a textile structure with enchanted stiffness and rigidity. A vacuum device 66 can be used to draw air A (or other suitable gas) from the bladder 64 to force the first knitted fabric layer 40 toward the second knitted fabric layer 44 in order to interlock the first knitted fabric layer 40 and the second knitted fabric layer 44 together. Also, the nominal state is the collapsed state, the bladder 64 could be inflated so that the first knitted fabric layer 40 and the second knitted fabric layer 44 cease to make contact and allow for relative motion between the first knitted fabric layer 40 and the second knitted fabric layer 44.

Figure 9:
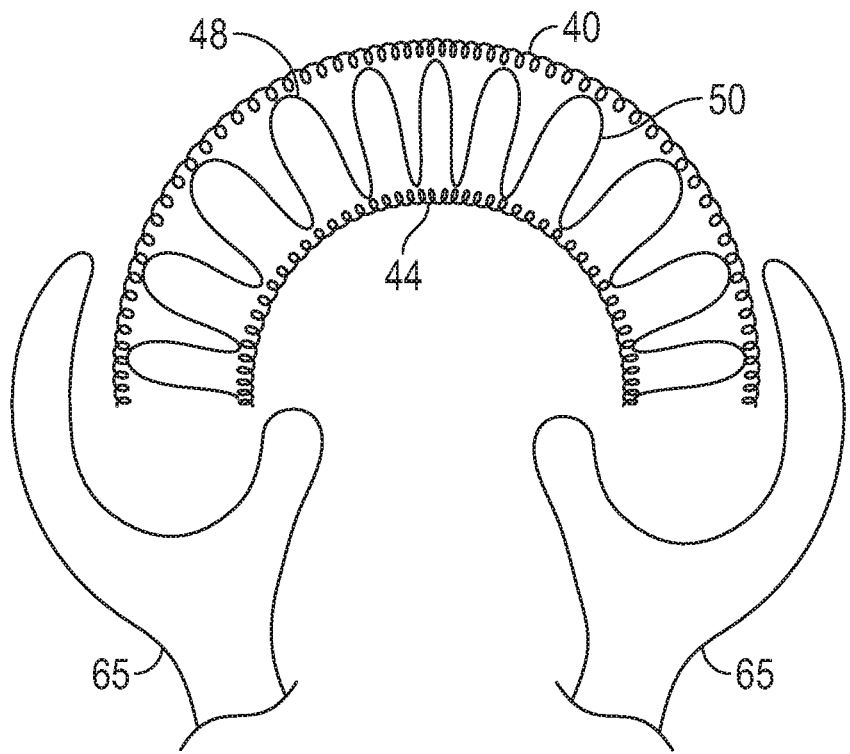
FIG. 9 is a schematic, side view of a first knitted fabric layer and a second knitted fabric layer before being bent before being placed on the bladder.
Figure 10:
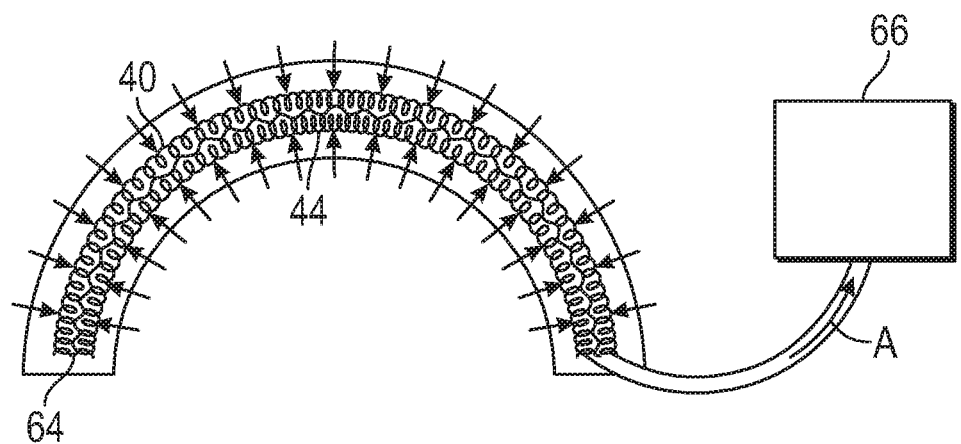
FIG. 10 is a schematic, side view of a first knitted fabric layer and a second knitted fabric layer of FIG. 9 placed on the bladder.

With reference to FIGS. 9 and 10, the method for mechanically interlocking the first knitted fabric layer 40 and a second knitted fabric layer 44 includes providing the first knitted fabric layer 40, the second knitted fabric layer 44, and the interconnection 48 interconnecting the first knitted fabric layer 40 and the second knitted fabric layer 44. Then, the first knitted fabric layer 40, the second knitted fabric layer 44, and the interconnection 48 are simultaneously bent with, for example, bending tools 65, until the first knitted fabric layer 40, the second knitted fabric layer 44, and the interconnection 48 collectively reach a predetermined deformed shape. Next, the first knitted fabric layer 40, the second knitted fabric layer 44, and the interconnection 48 are placed on the outside surfaces of the bladder 64 after the first knitted fabric layer 40, the second knitted fabric layer 44, and the interconnection 48 are in the predetermined deformed shape. After (and while) the first knitted fabric layer 40 and the second knitted fabric layer 44 are in the predetermined deformed shape, the first knitted fabric layer 40 and the second knitted fabric layer 44 are placed on the outer surfaces of the bladder 64 as shown in FIG. 10. Once the first knitted fabric layer 40 and the second knitted fabric layer 44 are on the bladder 64, a vacuum is drawn to collapse the bladder 64 in order to jam the first knitted fabric layer 40 and the second knitted fabric layer 44 together, thereby interlocking the first knitted fabric layer 40 toward the second knitted fabric layer 44 in the predetermined deformed shape to create a textile structure with enchanted stiffness and rigidity. The vacuum device 66 can be used to draw air A (or other suitable gas) from the bladder 64 to force the first knitted fabric layer 40 toward the second knitted fabric layer 44 in order to interlock the first knitted fabric layer 40, the interconnection 48, and the second knitted fabric layer 44 together in the predetermined deformed shape.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle seat, comprising:
   a first knitted fabric layer defining an outer surface;
   a second knitted fabric layer defining an inner surface, wherein the inner surface is opposite the outer surface;
   an interconnection coupling the first knitted fabric layer to the second knitted fabric layer, wherein the interconnection resiliently biases the first knitted fabric layer and the second knitted fabric layer away from one another, and the interconnection is configured to buckle when a seated occupant exerts an occupant load on the vehicle seat;
   wherein the first knitted fabric layer is more elastic than the second knitted fabric layer to conform to the seated occupant when the seated occupant exerts the occupant load on the vehicle seat; and
   wherein the interconnection includes a first support area and a second support area spaced apart from each other along a horizontal direction, the first support area and the second support area are stiffer than a rest of the interconnection to constrain load transfer when the seated occupant exerts the occupant load on the vehicle seat, and the first support area and second support area are positioned to receive a pair of sit bones of the seated occupant, the interconnection includes a knitted spacer fabric, the knitted spacer fabric includes a plurality of pile yarns interconnecting the first knitted fabric layer and the second knitted fabric layer, and the pile yarns forming the first support area and the second support area are stiffer and/or denser that the pile yarns forming a rest of the knitted spacer fabric.

2. The vehicle seat of claim 1, a tension in the second knitted fabric layer is higher than a tension in the first knitted fabric layer.

3. The vehicle seat of claim 1, wherein the first layer area of the first knitted fabric layer is aligned with the first support area of the interconnection along a first vertical axis such that the first vertical axis intersects the first layer area and the first support area.

4. The vehicle seat of claim 3, wherein the second layer area of the second knitted fabric layer is aligned with the second support area of the interconnection along a second vertical axis such that the second vertical axis intersects the second layer area and the second support area, the first vertical axis is parallel to the second vertical axis, and the first vertical axis is spaced apart from the second vertical axis along the horizontal direction.

5. The vehicle seat of claim 4, wherein the first layer area of the first knitted fabric layer is aligned with the first support area of the interconnection along a vertical direction, the vertical direction is perpendicular to the horizontal direction, the first layer area and the second layer area are aligned with each other along a longitudinal direction in order to receive the pair of sit bones of the seated occupant, the longitudinal direction is perpendicular to the vertical direction and the horizontal direction.

6. The vehicle seat of claim 5, wherein each of the first support area and the second support area extends from the first knitted fabric layer to the second knitted fabric layer to constrain load transfer from the first knitted fabric layer and the second knitted fabric layer through the first support area and the second support area when the seated occupant exerts the occupant load on the vehicle seat in order to support the pair of sit bones of the seated occupant.

7. A vehicle seat, comprising:
a first knitted fabric layer defining an outer surface;
a second knitted fabric layer defining an inner surface, wherein the inner surface is opposite the outer surface;
an interconnection coupling the first knitted fabric layer to the second knitted fabric layer, wherein the interconnection is configured to buckle when a seated occupant exerts an occupant load on the vehicle seat, the interconnection is a knitted fabric spacer, and the knitted spacer fabric does not include woven materials;
wherein the first knitted fabric layer is more elastic than the second knitted fabric layer to conform to the seated occupant when the seated occupant exerts the occupant load on the vehicle seat; and
wherein the interconnection includes a first support area and a second support area spaced apart from each other along a horizontal direction, the first support area and the second support area are stiffer than a rest of the interconnection to constrain load transfer when the seated occupant exerts the occupant load on the vehicle seat, and the first support area and second support area are positioned to receive a pair of sit bones of the seated occupant, the interconnection includes a knitted spacer fabric, the knitted spacer fabric includes a plurality of pile yarns interconnecting the first knitted fabric layer and the second knitted fabric layer, and the pile yarns forming the first support area and the second support area are stiffer and/or denser that the pile yarns forming a rest of the knitted spacer fabric.

8. The vehicle seat of claim 7, wherein the first knitted fabric layer includes a first layer area and a second layer area spaced apart from each other along the horizontal direction, the first layer area and the second layer area are stiffer than a rest of the first knitted fabric layer to constrain load transfer when the seated occupant exerts the occupant load on the vehicle seat, and the first layer area and second layer area are positioned to receive the pair of sit bones of the seated occupant, the first layer area of the first knitted fabric layer is aligned with the first support area of the interconnection along a first vertical axis such that the first vertical axis intersects the first layer area and the first support area, the second layer area of the second knitted fabric layer is aligned with the second support area of the interconnection along a second vertical axis such that the second vertical axis intersects the second layer area and the second support area, the first vertical axis is parallel to the second vertical axis, and the first vertical axis is spaced apart from the second vertical axis along the horizontal direction, the first layer area of the first knitted fabric layer is aligned with the first support area of the interconnection along a vertical direction, the vertical direction is perpendicular to the horizontal direction, the first layer area and the second layer area are aligned with each other along a longitudinal direction in order to receive the pair of sit bones of the seated occupant, the longitudinal direction is perpendicular to the vertical direction and the horizontal direction, each of the first support area and the second support area extends from the first knitted fabric layer to the second knitted fabric layer to constrain load transfer from the first knitted fabric layer and the second knitted fabric layer through the first support area and the second support area when the seated occupant exerts the occupant load on the vehicle seat in order to support the pair of sit bones of the seated occupant.

\* \* \* \* \*